US011553688B1

(12) United States Patent
Weiser

(10) Patent No.: US 11,553,688 B1
(45) Date of Patent: Jan. 17, 2023

(54) HAY HANDLE FOR USE WITH A HAY NET

(71) Applicant: Laurie Jennifer Weiser, Pittsboro, NC (US)

(72) Inventor: Laurie Jennifer Weiser, Pittsboro, NC (US)

( * ) Notice: Subject to any disclaimer, the term of this patent is extended or adjusted under 35 U.S.C. 154(b) by 0 days.

(21) Appl. No.: 17/704,104

(22) Filed: Mar. 25, 2022

(51) Int. Cl.
*A01K 5/01* (2006.01)
*A01K 5/00* (2006.01)

(52) U.S. Cl.
CPC .................................. *A01K 5/008* (2013.01)

(58) Field of Classification Search
CPC .......... A01K 5/00; A01K 5/008; A01K 63/00; A01K 69/02; A01K 73/00; A01K 74/00; A01K 97/20; B65B 67/1227; B65B 67/1233
USPC ................................................ 119/65, 66, 68
See application file for complete search history.

(56) References Cited

U.S. PATENT DOCUMENTS

| 4,492,052 | A | * | 1/1985 | Davis | ..................... | A01K 77/00 43/12 |
| 5,203,281 | A | * | 4/1993 | Harwich | ............ | A01K 39/0113 119/57.9 |
| 5,344,109 | A | * | 9/1994 | Hokoana, Jr. | ......... | B65F 1/1415 383/33 |
| 8,677,940 | B1 | * | 3/2014 | Anderson | .............. | A01K 5/008 119/65 |
| 2015/0122188 | A1 | * | 5/2015 | Webster | ................... | A01K 1/10 119/65 |
| 2016/0106062 | A1 | * | 4/2016 | Singh | ....................... | A01K 1/10 119/65 |
| 2017/0142928 | A1 | * | 5/2017 | Rust | ....................... | A01K 5/008 |
| 2017/0251631 | A1 | * | 9/2017 | Webster | ................... | A01K 1/10 |

FOREIGN PATENT DOCUMENTS

| CN | 215084726 U | * | 12/2021 | ............. | A63B 69/00 |
| DE | 202012001400 U1 | * | 5/2012 | ............... | A01K 5/01 |
| DE | 202014002349 U1 | * | 10/2014 | ............. | A01K 5/008 |

(Continued)

OTHER PUBLICATIONS

Dura-Tech® StableHand™, web page found at https://www.sstack.com/dura-tech-stablehand/p/22661/, Aug. 28, 2021, 20 pages as collected from web site including an array of photos, Schneiders Saddlery Co Inc, Chagrin Falls, Ohio, United States of America.

(Continued)

*Primary Examiner* — David J Parsley
*Assistant Examiner* — Danielle A Clerkley
(74) *Attorney, Agent, or Firm* — Kevin E Flynn; Flynn IP Law

(57) ABSTRACT

A hay handle for use with a hay net in order to facilitate loading of the hay net and a method of providing a quantity of forage to an animal through use of a hay handle and an engaged hay net. The handle assembly that is adapted to be placed into an open position wherein the hay handle assembly rotates around a pair of hinges to the open position so that forage may be inserted into an open mouth of a hay net; and a closed position wherein the hay handle assembly rotates around the pair of hinges to the closed position so that the animal may access the quantity of forage in the hay net through a set of open gaps in the hay net not including the open mouth of the hay net used for filling the hay net.

9 Claims, 13 Drawing Sheets

(56) References Cited

FOREIGN PATENT DOCUMENTS

| DE | 202016000235 U1 | * | 3/2016 | ............... A01K 5/00 |
|---|---|---|---|---|
| DE | 202017000469 U1 | * | 3/2017 | ............. A01K 5/008 |
| EP | 2805610 A1 | * | 11/2014 | ............. A01K 5/008 |
| GB | 2532253 A | * | 5/2016 | ............. A01K 5/008 |

OTHER PUBLICATIONS

Hay Hoops Original Collapsible Wall Hay Feeder, web page found at https://www.sstack.com/hay-hoops-original-collapsible-wall-hay-feeder/p/25615/. Aug. 28, 2021, 21 pages as collected from web site including an array of photos, Schneiders Saddlery Co Inc, Chagrin Falls, Ohio, United States of America.

Easy-Up® Pro Easy Load Frame for Hay Nets, web page found at https://www.sstack.com/easy-up-pro-easy-load-frame-for-hay-nets/p/41474/, Aug. 28, 2021, 17 pages as collected from web site including an array of photos, Schneiders Saddlery Co Inc, Chagrin Falls, Ohio, United States of America.

Easy-Up® FreeHand™ Feeder, web page found at https://www.sstack.com/easy-up-freehand-feeder/p/42407/, Aug. 28, 2021, 15 pages as collected from web site including an array of photos, Schneiders Saddlery Co Inc, Chagrin Falls, Ohio, United States of America.

Hay Chix® Free Up Feeder, web page found at https://www.sstack.com/hay-chix-free-up-feeder/p/41442/, Aug. 28, 2021, 11 pages as collected from web site including a photo, Schneiders Saddlery Co Inc, Chagrin Falls, Ohio, United States of America.

15cm Coin purse closure hardware purse clasp frame, web page found at https://shop.factoryguy.com/15cm-coin-purse-closure-hardware-purse-clasp-frame-p-386.html Aug. 28, 2021, 2 pages as printed.

* cited by examiner

200

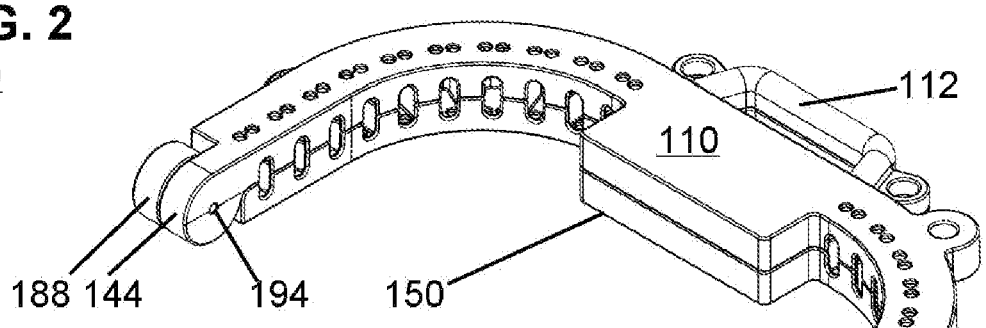
FIG. 2
100
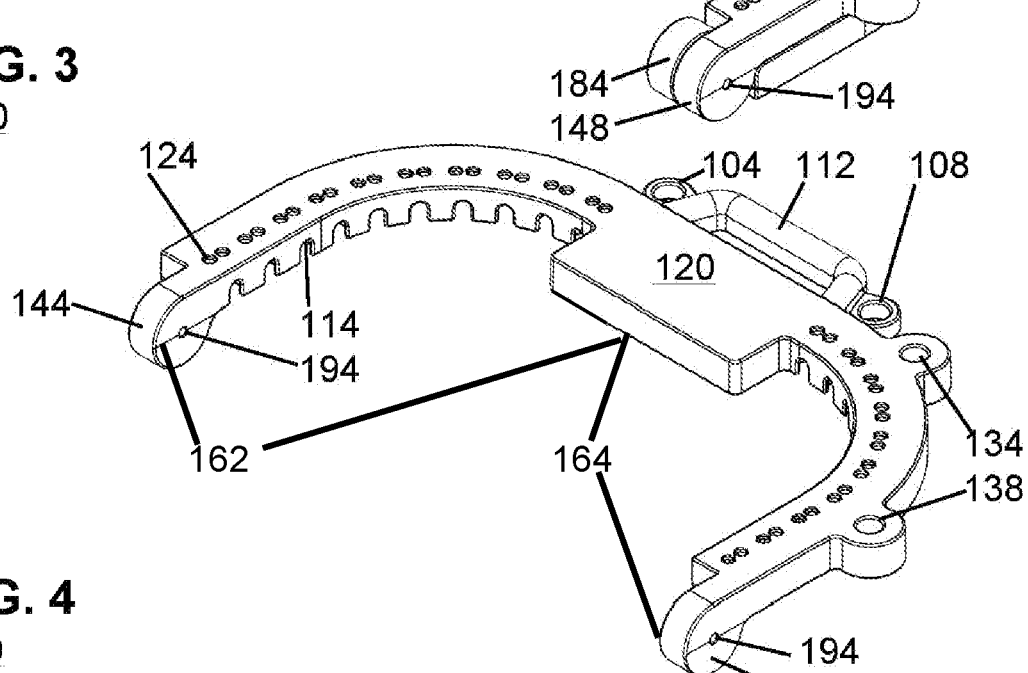
FIG. 3
110
FIG. 4
150
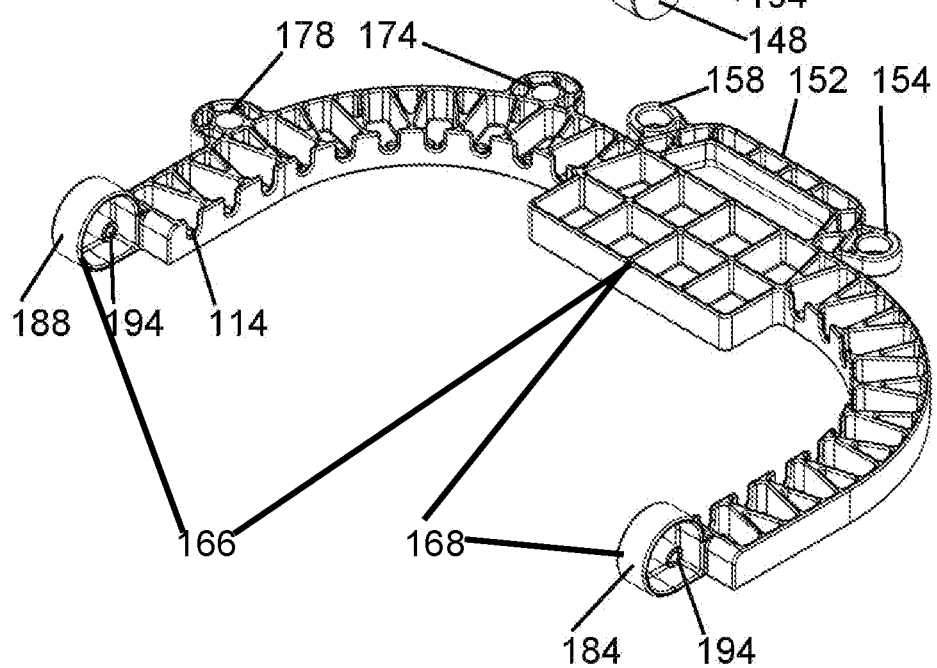

| 1004 | Obtain a hay handle assembly |
|---|---|

↓

| 1008 | Obtain the hay net. |
|---|---|

↓

| 1012 | Optional Step -- Remove the cinch cord from the hay net. |
|---|---|

↓

| 1016 | Obtain one or more cords for use in securing the loops forming the perimeter around the mouth of the hay net. |
|---|---|

↓

| 1020 | Divide the loops 204 for the four quadrants |
|---|---|

↓

| 1024 | Engage the loops from the upper end of the hay net with the one or more cords. |
|---|---|

↓

| 1028 | Open the hay handle assembly 100 and the engaged hay net 200. |
|---|---|

↓

| 1032 | Optional step of hanging a portion of the hay handle assembly 100. |
|---|---|

↓

| 1036 | Fill the hay net 200 by placing forage into the hay net 200 through the open hay handle assembly 100. |
|---|---|

↓

— — — — — — — — — —

100

100

100

100

100

100

100

100

HAY HANDLE FOR USE WITH A HAY NET

BACKGROUND

Field of the Disclosure

This disclosure relates generally to hay nets (sometimes haynets). Hay nets are a container with a porous net that allows an animal to eat a material like hay through the net. As the animal must work small amounts of hay through the openings in the net, the animal eats slowly over a prolonged period rather than quickly eating a day's worth of food in a brief period.

More specifically, this is a hay net that is easier to fill than earlier hay nets as the time for a person to fill each hay net in each stall for each animal is part of the cost of maintaining the animal.

Related Art

Hay nets which have been around for decades are a great solution for slowly feeding an animal. Owners like that a hay net slows the eating rate and often serves to keep the stall tidy relative to feeding from a trough or on the ground. Typically, after filling, the hay net hangs on the wall of the stall through a variety of fastener options such as clips or latches.

FIG. 1 shows a hay net 200 after loading with forage material 210 such as hay. An animal can access the forage material with effort through net openings 254. The net openings 254 are much smaller than the mouth opening 260 at the top of the hay net 200. The mouth opening 260 is used for filling the net with forage material 210 and then the cinch rope 264 is pulled to bring an engaged set of top loops 268 into a close circle that is too small to allow the animal to access the forage material 210 through the now-cinched mouth opening 260.

The process of filling a hay net still has room for improvement. Some people have to fill five, ten, twenty or more hay nets every day. An inefficient process to fill hay nets is both aggravating and time consuming. The problem with filling a traditional hay net is that the hay net is essentially a very porous sack with appropriately sized net openings 254 with a large mouth opening 260. It is difficult to keep the large mouth opening 260 of the sack of the hay net under control with just one hand while the other hand is feeding clumps or flakes of hay from a hay bale or other forage material 210 into the mouth opening 260 of the hay net 200.

As there is brand loyalty for hay nets, it would be advantageous to have a solution that worked with multiple brands of hay nets for a given type of animal. For example a solution for use with a horse would ideally be able to accommodate hay nets 200 from different manufactures as long as the hay nets were sized for use with a horse rather than a rabbit.

The solution needs to be durable as the solution will be left with unsupervised animals and often large animals but yet ideally the solution should be relatively light and suitable for plastic injection molding.

In some cases, a hay net has been modified to permanently mount the hay net and a filling tool to a wall. This is not optimal as it does not allow quick flexibility in the height in which the hay net is hung, and ideally a hay net is portable. Height is important if the animal to be fed wears shoes. It the animal wears shoes (like horse shoes), then the hay net must be hung higher to prevent their shoes from getting caught in the net as the animal may paw the hay net with a foot wearing a shoe while eating. Portable is helpful in several ways. Sometimes it is convenient to fill several hay nets in one location and then deliver filled hay nets to individual animal stalls. Sometimes an animal that is normally in a stall is moved to a trailer and then to a temporary stall at a show. Ideally, the hay net for that animal moves with the animal.

Vocabulary.

A, An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Animal.

Hay nets have been used for a wide range of animals. Hay nets are tuned to a particular animal by changing the mesh opening size of the hay net, and possibly the volume of feed contained in the hay net. While the example of a hay net provided in this disclosure is set for a horse, that is not intended to be limiting. The term animal should be interpreted to include any animal that may be fed using a hay net including but not limited to horses, mules, ponies, donkeys, miniature horses, cattle, goats, sheep, birds, rabbits, and chicken. Animals may include herbivore pets such as guinea pigs that are fed various types of hay as part of their diet.

Gne and Gnes.

To avoid the awkward he/she and his/her or the potentially confusing singular use of they and their, this application uses the gender-neutral pronoun—gne, the possessive pronoun—gnes, reflexive pronoun—gneself and the object form—gnerm. Example—gne was pleased with gnes gift that Adam gave to gnerm.

Hay.

Hay is grass, legumes, or other herbaceous plants that have been cut and dried to be stored for use as animal fodder, particularly for large grazing animals raised as livestock, such as cattle, horses, goats, and sheep. However, it is also fed to smaller domesticated animals such as rabbits and guinea pigs. See h t t p s://en.wikipedia.org/wiki/Hay Thus, the use of the term hay should not be deemed limiting to any particular plant or to a particular way to prepare hay for use as fodder. Hay as defined above falls within a larger category—forage material or sometimes simply—forage. Forage material may be defined as any plant material that animals graze or that is cut and fed to them. Thus, while the terms hay net and hay handle are used in this application as a common netted food is hay, the hay handle and hay net can be used to slow the rate of consumption of any netted forage material.

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Some aspects of the teachings of the present disclosure may be expressed as a method of providing a quantity of forage to an animal. The method including:

obtaining a hay net engaged to a hay handle assembly that is adapted for: an open position wherein the hay handle assembly rotates around a pair of hinges to the open position so that forage may be inserted into an open mouth of a hay net; and a closed position wherein the hay handle assembly rotates around the pair of hinges to the closed position so that the animal may access the quantity of forage in the hay net through a set of open gaps in the hay net not including the open mouth of the hay net used for filling the hay net;

opening the hay handle assembly;

inserting the quantity of forage though the hay handle assembly and into the hay net;

closing the hay handle assembly; and positioning the hay handle assembly and hay net with inserted forage in proximity to the animal so that the animal may slowly obtain forage through the set of open gaps in the hay net but not quickly obtain forage through the open mouth of the hay net.

Other aspects of the teachings of the present disclosure may be expressed as a method of adding a hay handle assembly to a hay net, the method including:

obtaining a hay net;

obtaining a hay handle assembly that is adapted for: an open position wherein the hay handle assembly rotates around a pair of hinges to the open position so that forage may be inserted into an open mouth of the hay net; and a closed position wherein the hay handle assembly rotates around the pair of hinges to the closed position so that an animal may access any forage in the hay net through a set of open gaps in the hay net not including the open mouth of the hay net used for filling the hay net; and engaging at least some of a set of hay net loops at an open mouth end of the hay net with the hay handle assembly so that A) when the hay handle assembly is rotated to the open position, forage may be inserted into the open mouth of the engaged hay net; and B) when the hay handle assembly is rotated to the closed position, the animal seeking forage contained in the engaged hay net is precluded from accessing forage through the open mouth of the engaged hay net and the animal must access forage through smaller openings in the engaged hay net.

Additional aspects of the teachings of the present disclosure may be expressed as a hay handle for use with a hay net in order to facilitate loading of the hay net, the hay handle including:

a pair of handle pieces comprising a first handle piece and a second handle piece joined by a pair of hinges so that the pair of handle pieces may be moved to an open position where the pair of handle pieces define an open perimeter through which forage may be inserted and a closed position which does not allow removal of forage from between the pair of handle pieces;

the pair of handle pieces having openings for receipt of inserted loops from a hay net so that inserted loops may be engaged with at least one cord so that the hay net remains engaged with the pair of handle pieces; and the pair of handle pieces having at least one pair of engagement features to that the pair of handle pieces in the closed position cannot be moved to the open position without releasing at least one engagement feature from the at least one pair of engagement features.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 2 is a top perspective view of the hay handle assembly 100 before the addition of hinge pins or the engagement with a hay net.

FIG. 3 is the same view as FIG. 2 but with second piece 150 rendered invisible.

FIG. 4 is the same view as FIG. 2 but with first piece 110 rendered invisible.

FIG. 12 is split across two pages, FIG. 12A and FIG. 12B.

DETAILED DESCRIPTION

Figure 1:
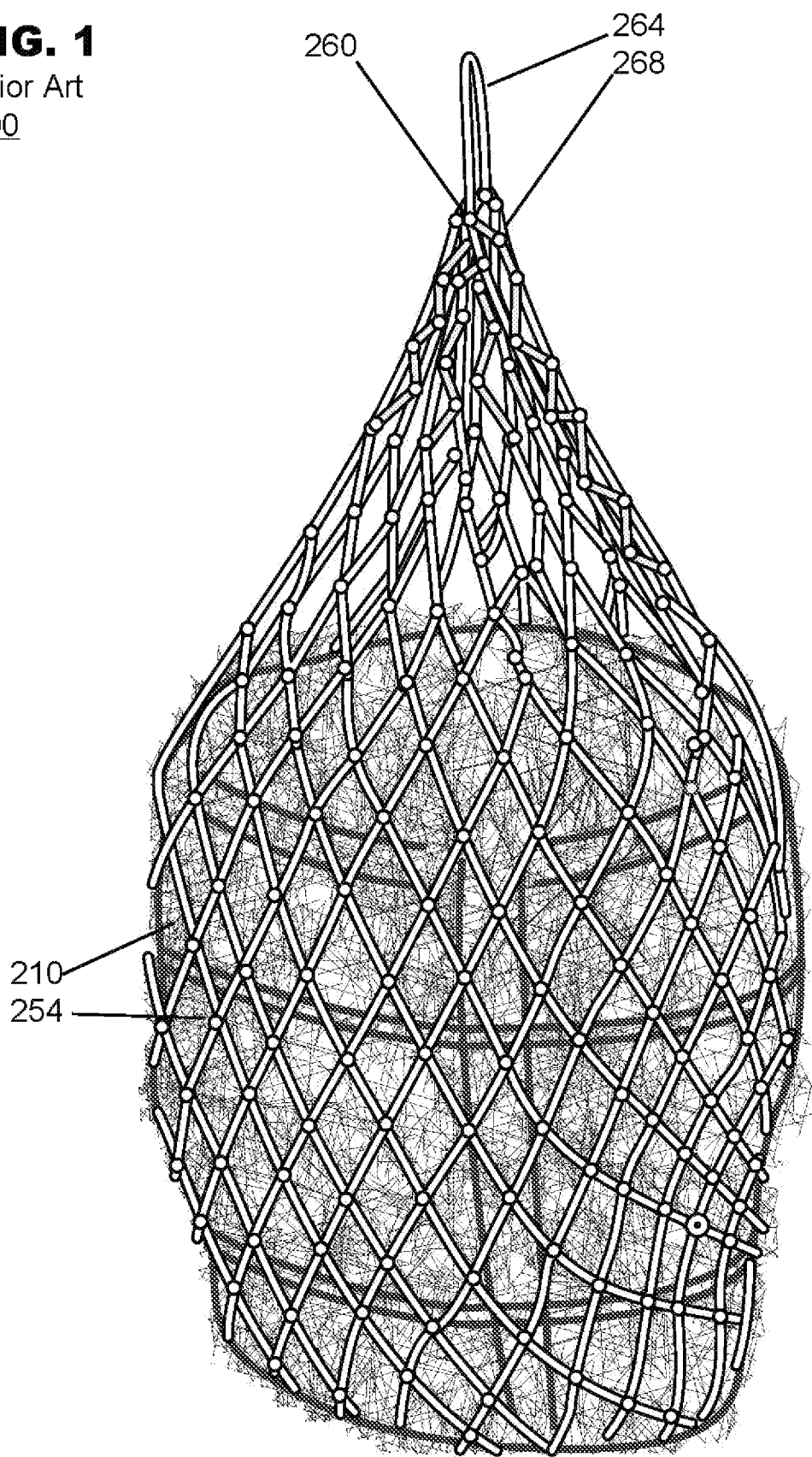
FIG. 1 shows a hay net 200 after loading with forage material 210 such as hay.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

FIG. 2 is a top perspective view of the hay handle assembly 100 before the addition of hinge pins or the engagement with a hay net. While not required for enjoyment of the teachings of the present disclosure, the hay handle assembly 100 is formed with a first piece 110 and a second piece 150 that may be identical in order to simplify the process of making injection molding molds and having inventory of components.

FIG. 3 is the same view as FIG. 2 but with second piece 150 rendered invisible.

FIG. 4 is the same view as FIG. 2 but with first piece 110 rendered invisible.

While viewing FIG. 2, FIG. 3, and FIG. 4 one can observe that both the first piece 110 and the second piece 150 have an inner hinge area (144 and 184) and an outer hinge area (148 and 188). Matching an inner hinge area with an outer hinge area aligns a pin axis 194 to allow a hinge pin to be inserted to join the first piece 110 and a second piece 150 and allow for rotation of the first piece 110 relative to the second piece 150 around the pin axis 194.

These figures also show a set of handle piece openings 114. The set of handle piece openings 114 on the first piece 110 substantially align with the set of handle piece openings 114 on the second piece 150. While this symmetry is attractive to the eye, it is not necessary. Loops from the upper perimeter of the hay net are inserted into each piece of the hay handle. So some loops are inserted into the first piece 110 and a different set of hay net loops are inserted into the second piece 150. The loops are captured so that they stay within the first piece 110 or the second piece 150 by running cord through loop lock holes 124 that are in both the first piece 110 as seen here and in the second piece 150 (not visible in this view). One of skill in the art will appreciate that there are other ways to connect the hay net 200 to a hay handle assembly 100 but one concrete example is provided here as part of the effort to clearly enable the teachings of this disclosure.

First piece 100 has two perimeter loops 134 and 138. Second piece 150 has two perimeter loops 174 and 178 which do not align with the perimeter loops 134 and 138. The function of these loops is to offer different ways of hanging the handles in the stall or affixing the handle to a wall. A rope cord can be attached to offer a hanging handle. Clips can be attached to then affix to the wall.

First piece 110 has handle 112. Second piece 150 has handle 152 that is aligned with handle 112 to form a handle with an opening to allow a user to carry the hay handle assembly 100. Those of skill in the art will appreciate that other shapes of handles could be used and the handle would not have to have a component on both the first piece 110 and the second piece 150.

First piece 110 has locking features 104 and 108 near handle 112. Second piece 150 has locking features 154 and 158 near handle 152. Locking features 104 and 158 are aligned in an assembled hay handle assembly 100. Locking features 108 and 154 are aligned in an assembled hay handle assembly 100. A locking device such as an appropriately sized carabiner (not shown here) may be inserted through a pair of aligned locking features to prevent a horse from urging a hay handle assembly 100 open to allow for access of the hay or other forage material through the open top of the hay handle assembly 100 rather than slowly ingesting food obtained through the small openings in the hay net 200. In many instances, locking just one side will be sufficient.

For a horse that is very aggressive in trying the open the hay handle assembly 100, it may be prudent to lock both sides. One of skill in the art will appreciate that many different locking mechanisms can be used to keep a locking loop type locking feature from one piece of the hay handle adjacent to a corresponding loop type locking feature of the opposite piece of the hay handle to preclude an animal from eating through the hay handles rather than through the intended openings in the hay net.

Optionally, the first piece 110 and the second piece 150 each contain a name section 120 that allows a user to write on the hay handle assembly 100 or place a printed label on the hay handle assembly 100 so that many hay handles assemblies 100 may be brought to an area to fill the engaged hay nets 200 and the handle assemblies 100 with the filled hay nets may be brought back to the same animal stall day after day through use of the information on the name section 120.

Figure 5:
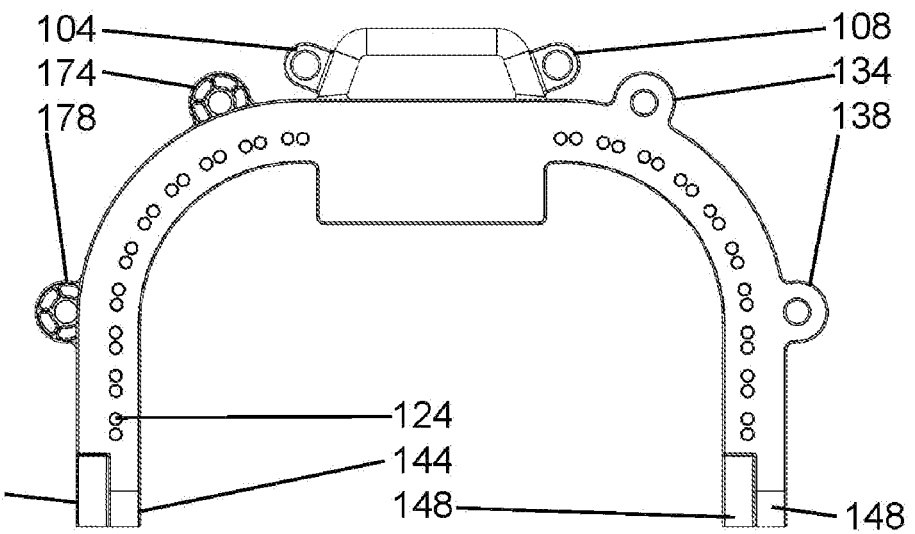
FIG. 5 is a top view of hay handle assembly 100.
Figure 6:
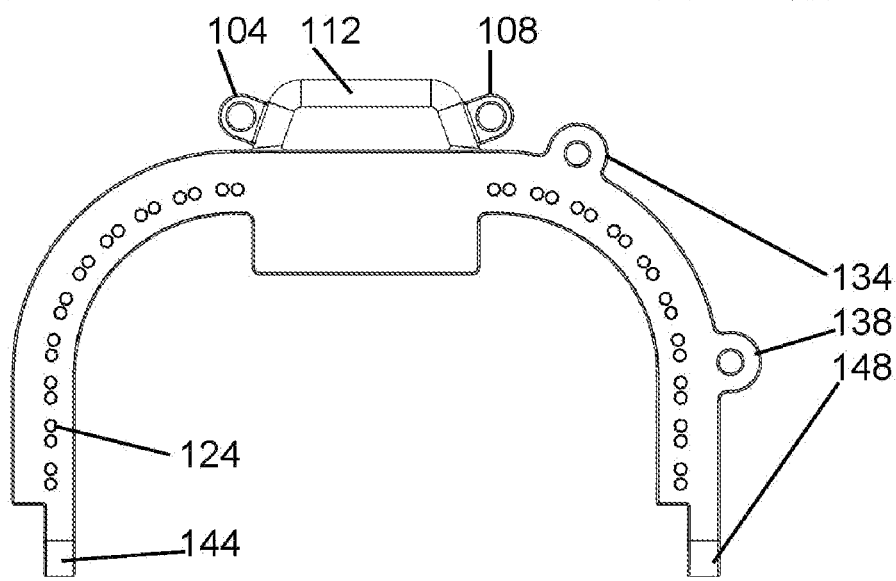
FIG. 6 is the same view as FIG. 5 but with second piece 150 rendered invisible.
Figure 7:
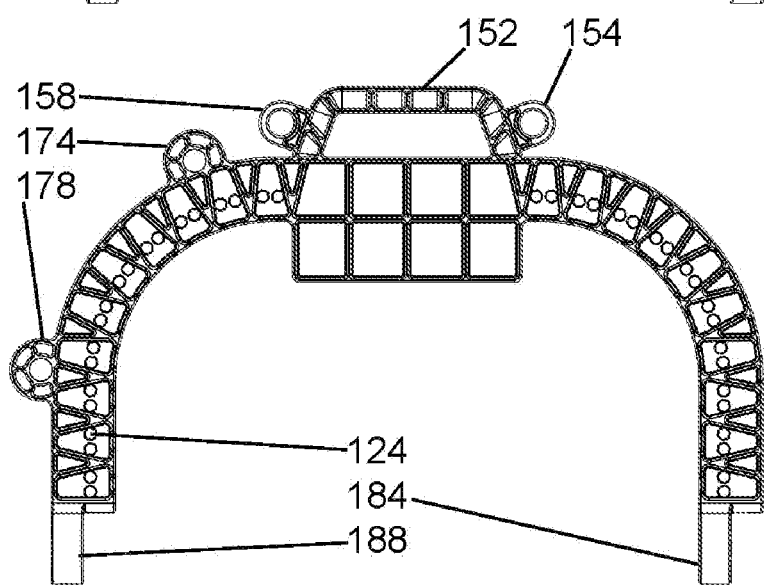
FIG. 7 is the same view as FIG. 5 but with first piece 110 rendered invisible.

FIG. 5 is a top view of hay handle assembly 100. FIG. 6 is the same view as FIG. 5 but with second piece 150 rendered invisible. FIG. 7 is the same view as FIG. 5 but with first piece 110 rendered invisible.

The set of three drawings do not introduce any new elements but show previously introduced elements:
  First piece locking features 104 and 108;
  Second piece locking features 154 and 158;
  Loop lock holes 124;
  Perimeter loops 134, 138, 174 and 178;
  Inner hinge area 144 and 184;
  Outer hinge area 148 and 188; and
  Handle 112 and 152.

Figure 8:
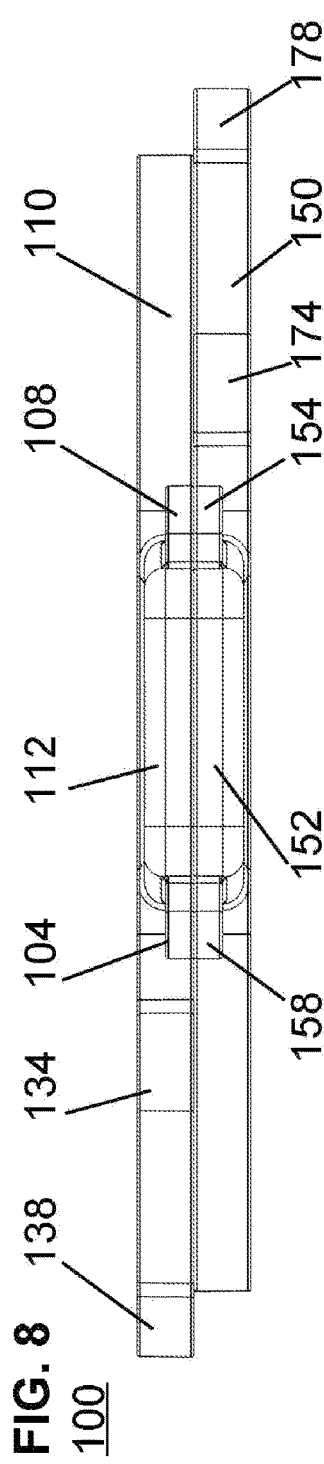
FIG. 8 is a front view of handle assembly 100 looking at handle 112 and 152.

FIG. 8 is a front view of handle assembly 100 looking at handle 112 and 152.

Figure 9:
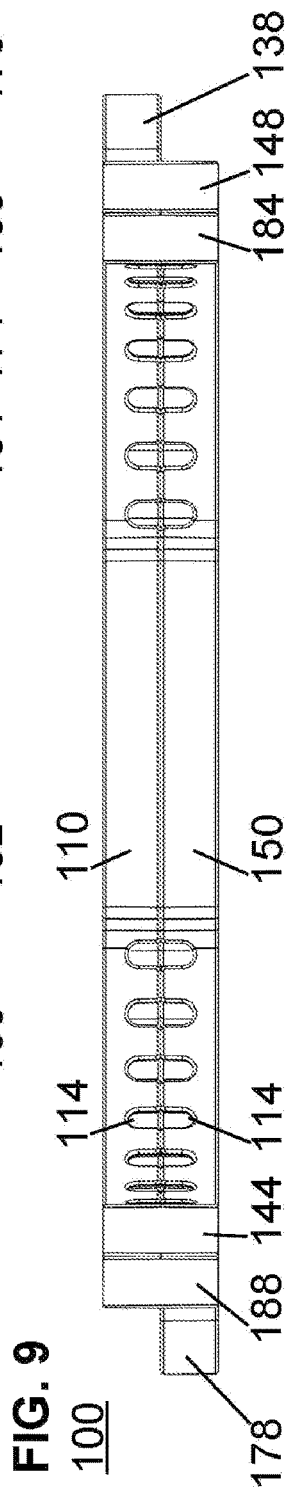
FIG. 9 is a rear view of handle assembly 100 looking up between the U-shaped handle.

FIG. 9 is a rear view of handle assembly 100 looking up between the U-shaped handle.

Figure 10:
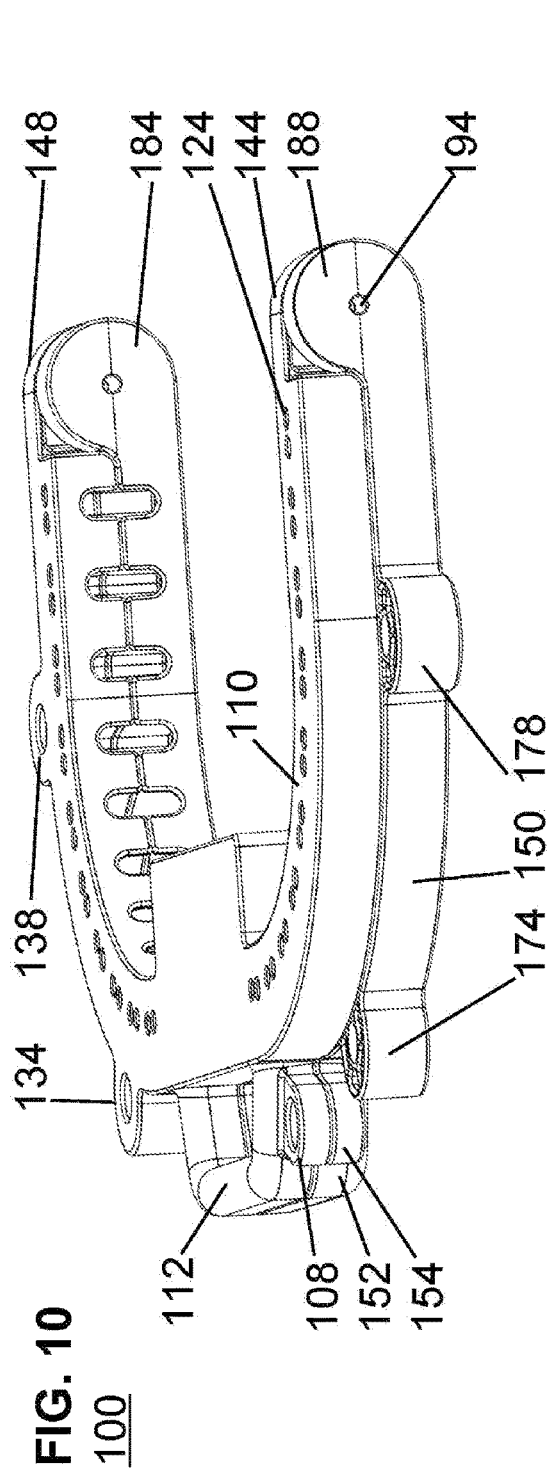
FIG. 10 is a top and side perspective view of hay handle assembly 100.

FIG. 10 is a top and side perspective view of hay handle assembly 100.

These three drawings show additional views of hay handle assembly 100 and previously introduced components including:
  First piece 110 and second piece 150;
  Locking features 104, 108, 154 and 158.
  Handle 112 and 152;
  Loop lock holes 124;
  Perimeter loops: 134, 138, 174, and 178

Figure 11:
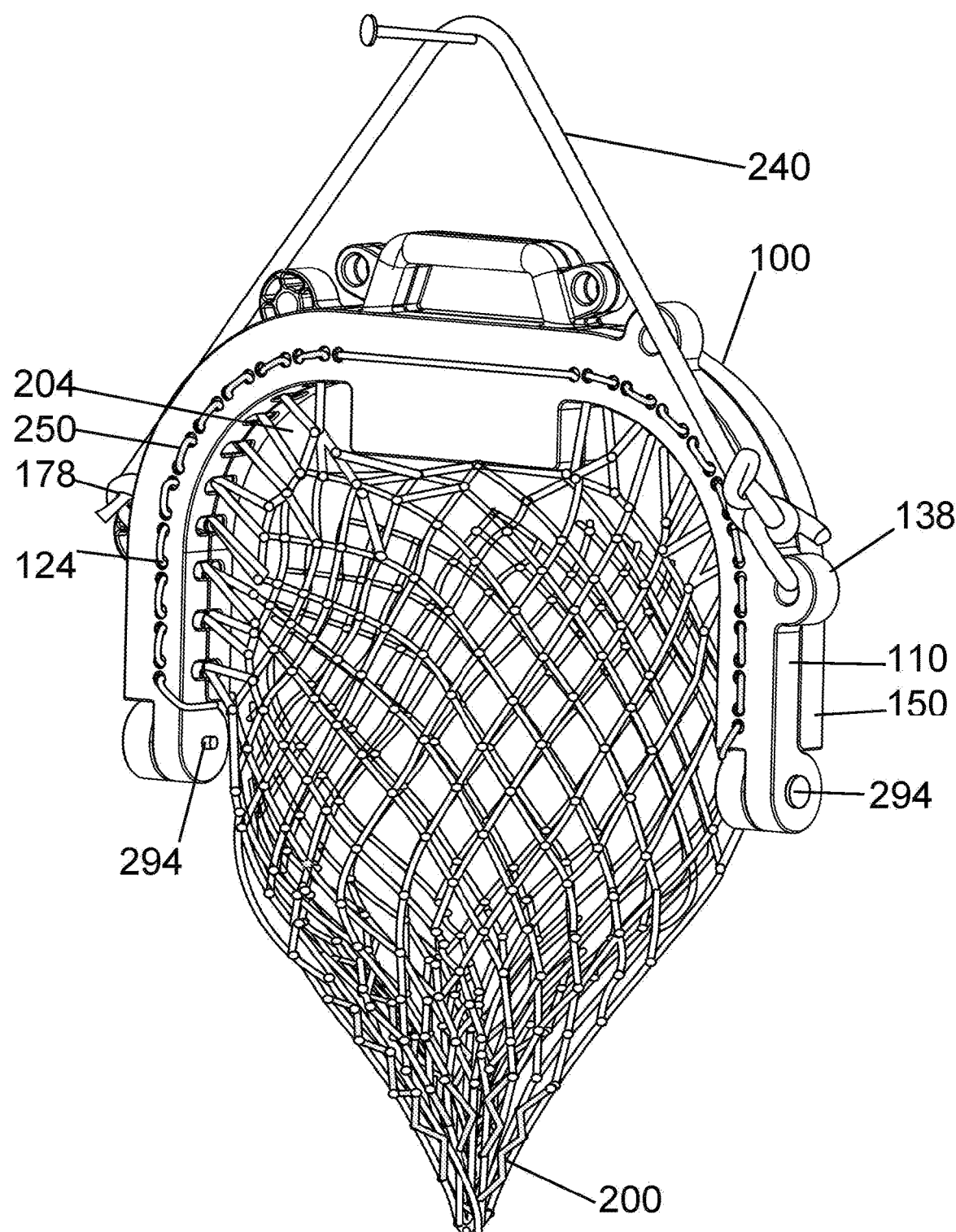
FIG. 11 is a top right perspective image of a hay handle assembly 100 with an engaged hay net 200.

FIG. 11 is a top right perspective image of a hay handle assembly 100 with an engaged hay net 200. Loops 204 of the hay net 200 are retained to the first piece 110 and the second piece 150 by cord 250 that that passed into and out of the first piece 110 and the second piece 150 through the loop lock holes 124 so that the loops 204 cannot be withdrawn through the handle piece openings 114.

A mounting rope 240 is engaged with perimeter loops 178 and 138 to that a hay handle assembly 100 with engaged hay net 200 may be hung from a hook or post. Hinge pins 294 running through pin axes 194 (FIG. 4) are visible. Those of skill in the art will appreciate that the hinge pin may be a simple cylinder that is retained by friction fit. The hinge pin may have an enlarged head on one end as shown here. The hinge pin may be set to receive a cotter pin or have a ball detent to retain the hinge pin in place. Many other variations are possible.

Process of Use.

Figure 12B:
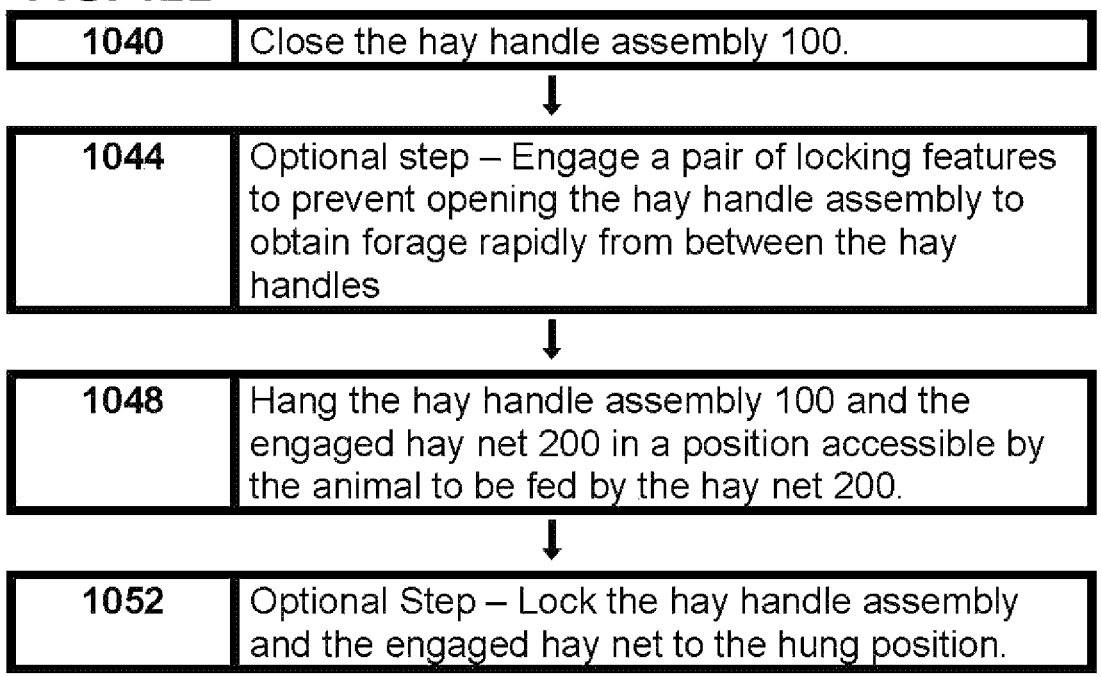
FIG. 12 shows a flowchart for a process 1000 for using a hay handle assembly 100.

FIG. 12 shows a flowchart for a process 1000 for using a hay handle assembly 100.

1004—Obtain a hay handle assembly 100 with a first piece and a second piece wherein the first piece and the second piece are engaged with one another with hinge pins 294 and able to rotate around a pair of pin axis lines so that the handle assembly 100 may go from an open position to allow forage to be introduced between the first piece and the second piece and a closed position where forage cannot be removed from between the first piece and the second piece.

1008—Obtain the hay net that will be enhanced with the hay handle. The hay net normally comes with a cinch rope that runs around the perimeter of the mouth of the hay net. When used without a hay handle the user fills the hay net and then pulls the mouth closed by pulling on the cinch rope just as one closes a laundry bag with a cinch cord.

1012—Optional Step—Remove the cinch cord from the hay net. While removing the cinch cord makes sense as there is no reason to have a cinch cord that will not be used, one could leave the cinch cord in place as long as the cinch cord was not constricting the opening.

1016—Obtain the one or more cords for use in securing the loops forming the perimeter around the mouth of the hay net. One option is to obtain four cords. Each cord needs a knot at one end so that tend of the cord does not pull through the hay handle. While using one cord for each quadrant of the hay handle is preferred, one of skill in the art will appreciate that one may use just one cord for both pieces of the hay handle or one cord for each piece of the hay handle. One could use more than four cords if desired such as if there was a desire to add additional colored cords. This explanation will assume the use of four cords.

1020—Divide the loops 204 for the four quadrants. Count the loops 204 forming the perimeter around the mouth of the hay net. As the loops 204 will be engaged with the four quadrants of the hay handle (right and left sides of each hay handle piece), divide the total number of loops 204 by four. Look at the number of handle piece openings 114 in each side of each hay handle piece (110, 150). Compare the number of handle piece openings 114 with the one fourth of the total number of loops 204. Ideally, the loops 204 are allocated evenly to the four hay net quadrants but the number of loops 204 does not have to be evenly divisible by four as slight deviations in the number of loops 204 per quadrant are acceptable.

The numbers may match such as ten openings per quadrant and forty loops for the hay net mouth. The numbers do not have to match as one can put more than one loop from the hay net mouth into a single handle piece opening 114 if there are too many loops or some handle piece openings 114 may be skipped of there are fewer loops than handle piece openings 114.

The hay handle may be used with any appropriately sized hay net. Those of skill in the art will appreciate that a hay handle sized for use with a hay net for a horse or other large animal will not be appropriate for use with a hay net for a much smaller animal such as a rabbit or a chicken.

For clarity, the four quadrants are:
  Quadrant 162 located on the first piece 110 between inner hinge area 144 and name section 120.
  Quadrant 164 located on the first piece 110 between outer hinge area 148 and name section 120
  Quadrant 166 located on the second piece 150 between outer hinge area 188 and name section 120.
  Quadrant 168 located on the second piece 150 between inner hinge area 184 and name section 120.

The one or more cords may be added to the quadrants starting with any of the four quadrants.

1024—Engage the loops from the upper end of the hay net with the one or more cords. Specifically, insert loops from the upper end of a hay net through handle piece openings in the first piece and engage the loops from the upper end of the hay net with the first piece. Starting with a handle piece opening 114 closest to a hinge area (144/188 or 148/184) may make the process go smoother. One way of doing this is to run a cord 250 through the loop lock holes 124 all the way until the knot at the trailing edge of the cord 250 abuts the hay handle assembly 100. Next engage the loops 204 with the hay handle assembly 100 in the relevant quadrant by moving the cord 250 through the loops 204 and the handle piece openings 114. At the end of the quadrant (if using four cords) engage the cord 250 with a crimp (not shown) and trim away the excess cord. Those of skill in the art will appreciate that there are other ways to engage a portion of the loops around the upper perimeter of the hay net with the first piece. For example the one or more cords could engage with features within the handle rather than engaging coming in and out of the handle through the loop lock holes 124. All that matter is that the loops 204 are engaged with the handle pieces.

Repeat for the remaining quadrants until all the loops 204 are engaged with the hay handle assembly 100 and retained by the set of one or more cords 250

1028—Open the hay handle assembly 100 and the engaged hay net 200.

1032—Optional step of hanging a portion of the hay handle assembly 100 on a wall or other location so that the hay handle assembly 100 and engaged hay net 200 is suspended in an open position and the user has two free hands.

1036—Fill the hay net 200 by placing forage into the hay net 200 through the open hay handle assembly 100.

1040—Close the hay handle assembly 100.

1044—Optional step—Engage a pair of locking features (104&158 or 108&154) with one locking loop on the first piece and one locking loop on the second piece so that an animal eating from the hay net engaged with the hay handle assembly cannot open the hay handle assembly to obtain forage rapidly from between the hay handles. If so desired, lock both pairs of locking loops rather than just one set. The engagement may be using a carabiner but it could be another locking device. While the engagement could be limited to components integral to the hay handle, in most cases, the engagement will involve an extra component such as a carabiner, a piece of cord, or some other item to engage a pair of locking loops.

1048—Hang the hay handle assembly 100 and the engaged hay net 200 in a position accessible by the animal to be fed by the hay net 200. Often the hay nets engaged to hay handle assemblies will be loaded at a location away from where the animal is kept and fed and the filled hay net and hay handle assembly is moved to the animal. However, nothing precludes filling the hay net 200 engaged with the hay handle assembly 100 in the location where the animal will be fed.

1052—Optional Step—Lock the hay handle assembly and the engaged hay net to the hung position. This prevents the animal from dislodging the hay handle assembly and engaged hay net from the hung position and moving the hay handle assembly and engaged hay net to the ground.

The locking could be achieved by having a pair of cords that engage with two of the perimeter loops (134, 138, 174, 178). Each cord has a distal end that is engaged with a carabiner. The pair of carabiners can engage with U-shaped hardware or rings that are mounted onto the wall. Alternatively, the hay handle assembly 100 may engage the two parts of the handle (112 and 152) with an appropriately sized "quick latch" which is a common item in horse stables as it is often used on gates.

Kit

The hay handle and related components may be sold separately, including selling individual components for use in repairs or replacement. The hay handle may be sold with other components in a kit for a new hay handle use. Such a kit may include:

Hay handle

Four strands of brightly colored cord to weave the hay net to the hay handles (one cord for each quadrant of the hay handle assembly). As the cords need a knot to avoid being pulled through the loop lock holes 124, each cord may have a knot at one end before inclusion in the kit.

Four Crimps to tighten the brightly colored cord and affix it to the hay handles One or two carabiners to lock the two sides together after the hay net has been filled so that the animal is forced to eat slowly through the netting rather than through the hay handles.

Optionally, the hay handle kit may include an appropriately sized hay net but in many instances the hay net will be purchased separately.

Clean Images.

Sometimes it is helpful to close out a patent application with a set of views of the device without a lot of element numbers and lead lines so that the design can be seen as a whole.

The following drawings show hay handle assembly 100 from a variety of vantage points.

Figure 13:
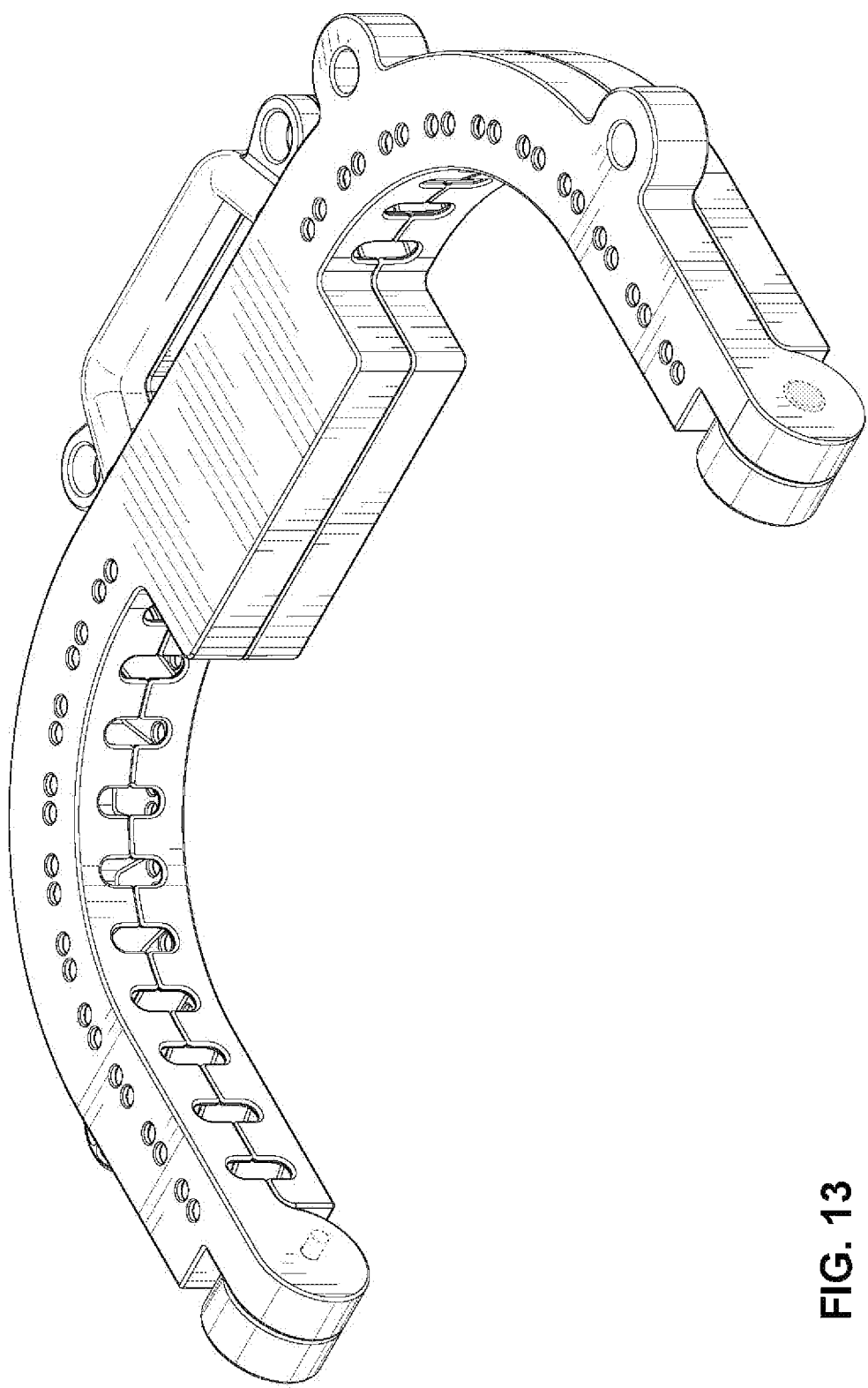
FIG. 13 is a top, right perspective view of hay handle assembly 100.

FIG. 13 is a top, right perspective view of hay handle assembly 100.

Figure 14:
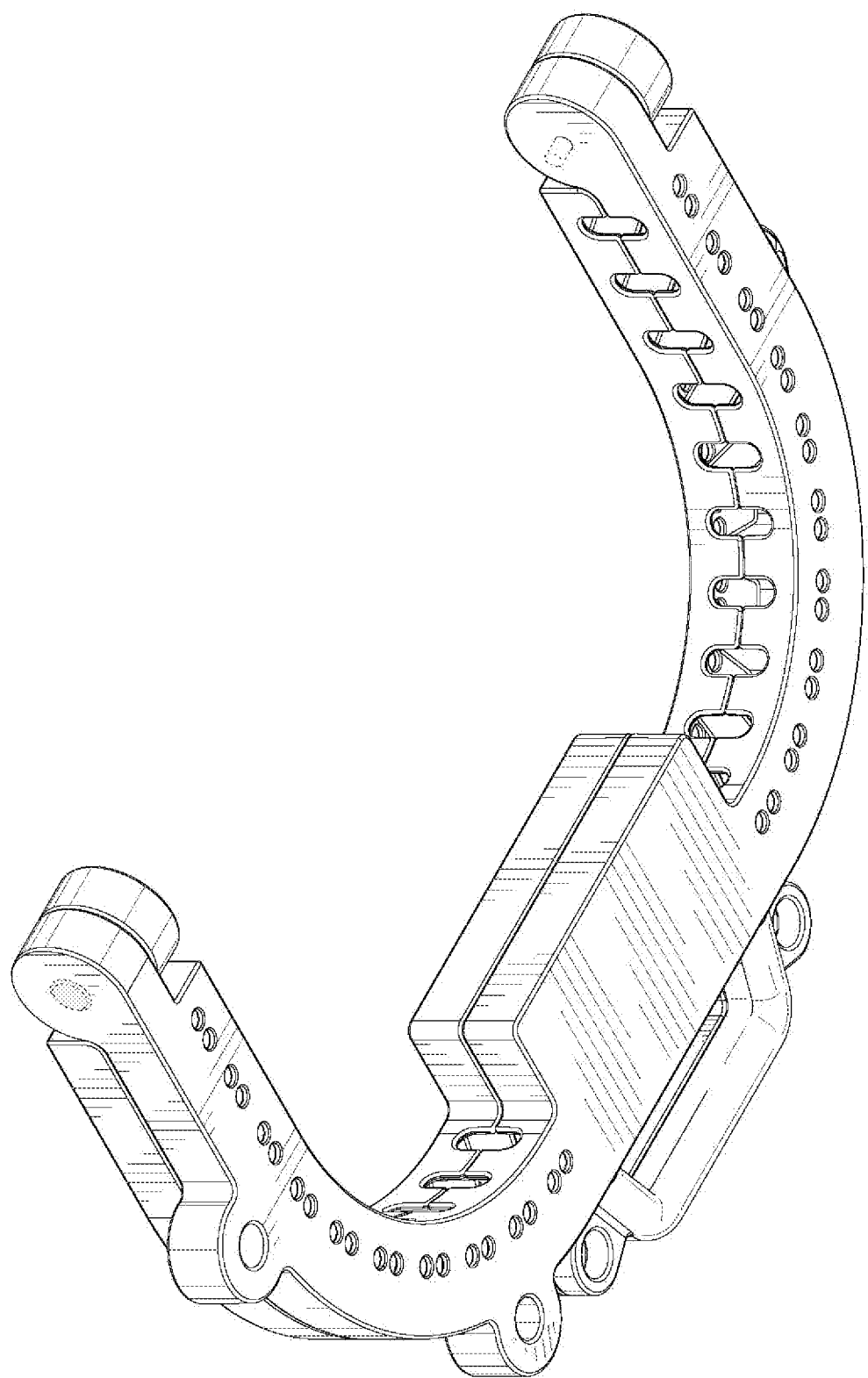
FIG. 14 is a bottom, left perspective view of hay handle assembly 100.

FIG. 14 is a bottom, left perspective view of hay handle assembly 100.

Figure 15:
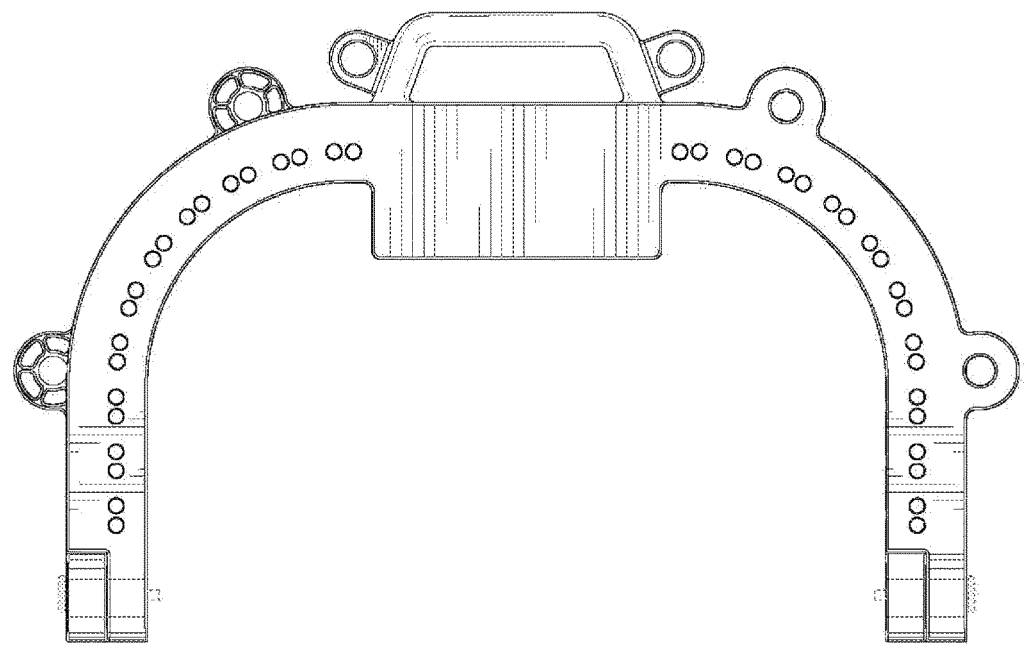
FIG. 15 is a top plan view of hay handle assembly 100.

FIG. 15 is a top plan view of hay handle assembly 100.

Figure 16:
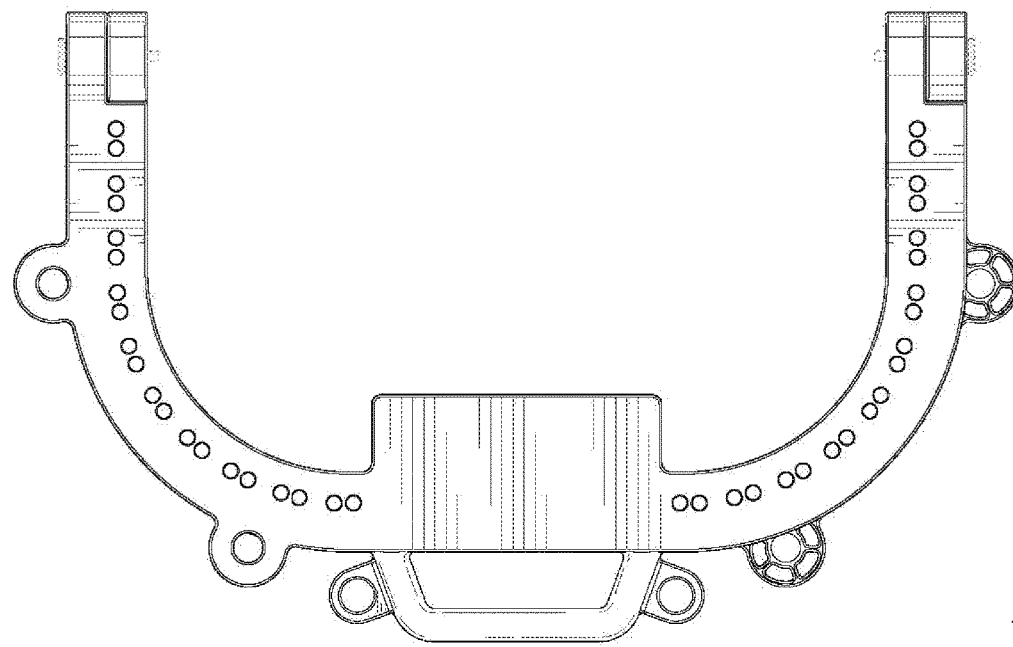
FIG. 16 is a bottom view of hay handle assembly 100.

FIG. 16 is a bottom view of hay handle assembly 100.

Figure 17:
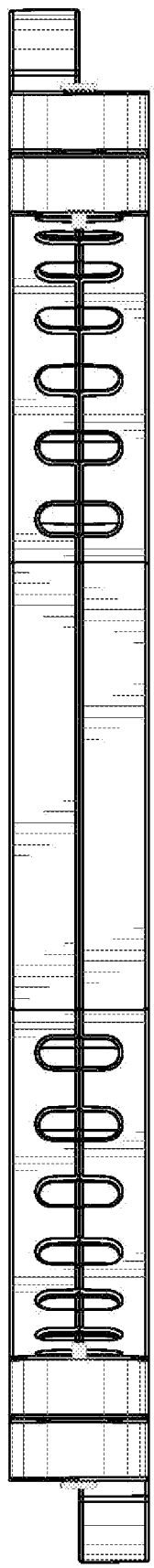
FIG. 17 is a front elevation view of hay handle assembly 100.

FIG. 17 is a front elevation view of hay handle assembly 100.

Figure 18:
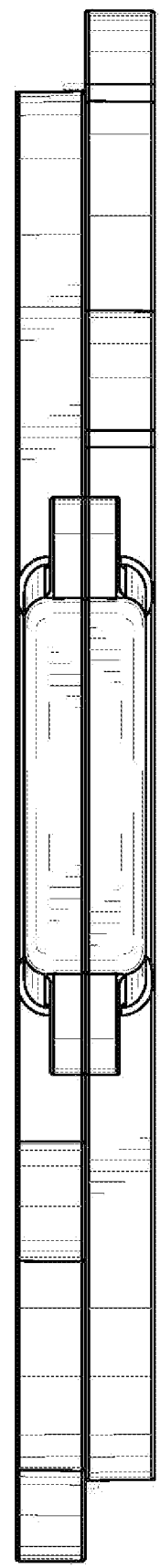
FIG. 18 is a back elevation view of hay handle assembly 100.

FIG. 18 is a back elevation view of hay handle assembly 100.

Figure 19:
FIG. 19 is a right side elevation view of hay handle assembly 100.

FIG. 19 is a right side elevation view of hay handle assembly 100.

Figure 20:
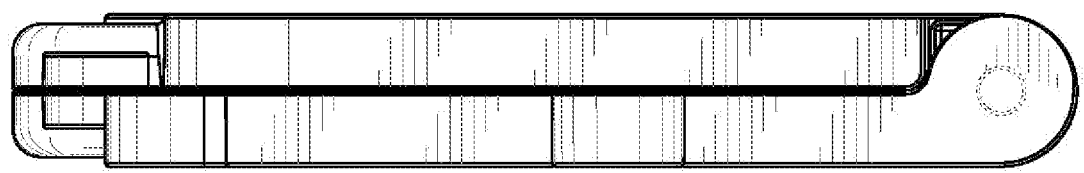
FIG. 20 is a left side elevation view of hay handle assembly 100.

FIG. 20 is a left side elevation view of hay handle assembly 100.

Figure 21:
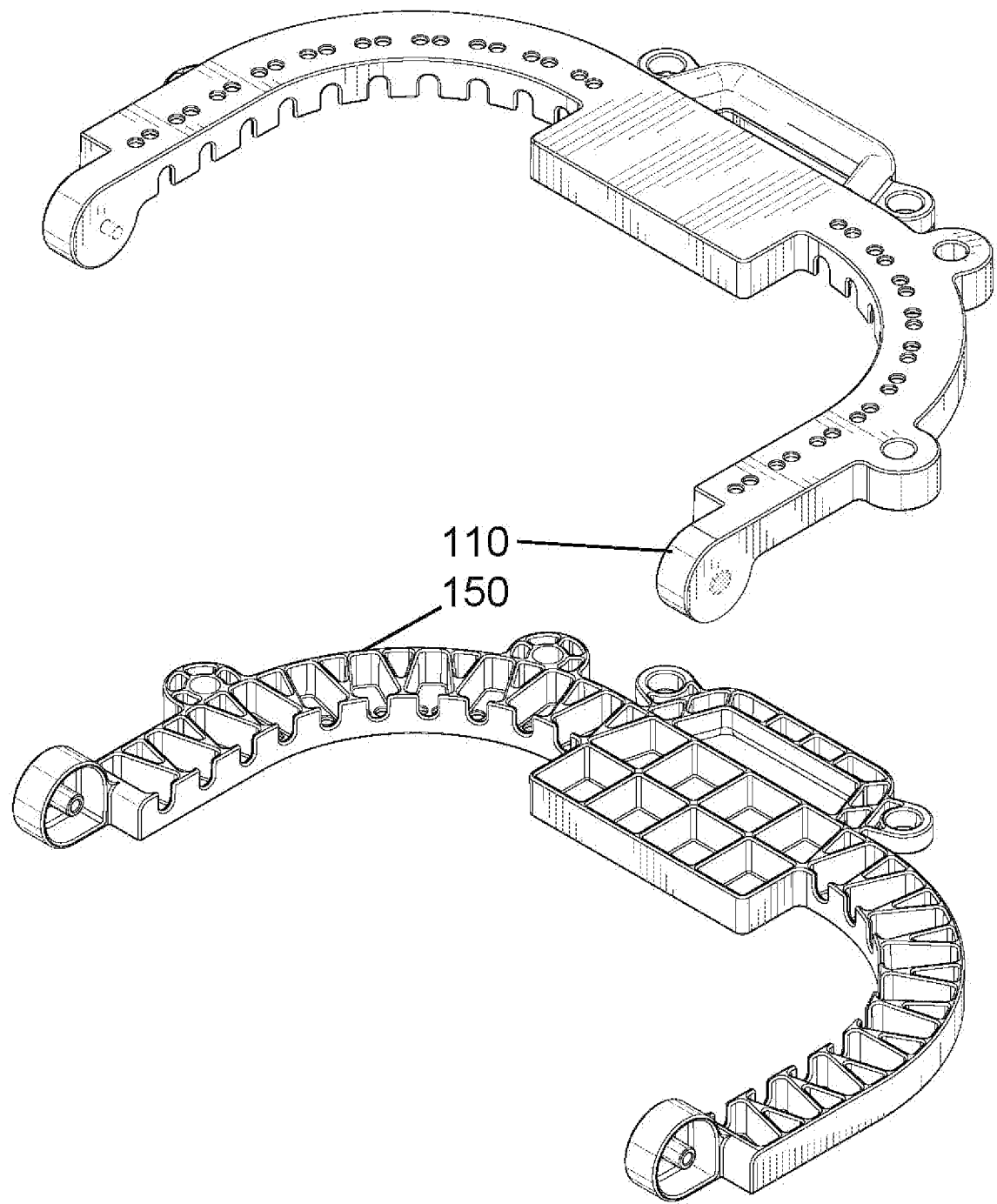
FIG. 21 is a top, right perspective view of first piece 110 and second piece 150.

FIG. 21 is a top, right perspective view of first piece 110 and second piece 150.

Alternatives and Variations

Locking Features.

One of skill in the art will appreciate that a wide variety of features on the first piece and the second piece may be used to lock the hay handle in the closed position. The locking feature does not have to be a loop that allows a locking element to pass through the pair of loops. The locking feature could be a protrusion that extends from a piece of the hay handle and is near another protrusion extending from the other piece of the hay handle such that a locking piece could capture each protrusion and thus preclude any increase in the distance between the two protrusions.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of providing a quantity of forage to an animal, the method comprising:
   obtaining a hay net engaged to a hay handle assembly;
   the hay net having a set of loops along a top perimeter of the hay net, the top perimeter forming an open mouth of the hay net;
   the hay handle assembly capturing at least a portion of the set of loops along the top perimeter of the hay net using a set of at least one cord that passes into and out of a set of holes in the hay handle assembly and through at least some of the set of loops along the top perimeter of the hay net;
   the hay handle assembly adapted for:
      an open position wherein the hay handle assembly rotates around a pair of hinges to the open position so that the quantity of forage may be inserted into the open mouth of the hay net; and
      a closed position wherein the hay handle assembly rotates around the pair of hinges to the closed position so that the animal may access the quantity of forage in the hay net through a set of open gaps in the hay net but not the open mouth of the hay net;
   opening the hay handle assembly;
   inserting the quantity of forage though the hay handle assembly and through the open mouth of the hay net;
   closing the hay handle assembly; and
   positioning the hay net engaged to the hay handle assembly with the quantity of forage in proximity to the animal so that the animal may slowly obtain forage through the set of open gaps in the hay net but not quickly obtain forage through the open mouth of the hay net.

2. The method of claim 1 wherein the step of inserting the quantity of forage though the hay handle assembly and through the open mouth of the hay net occurs while the hay handle assembly is engaged with an element that holds at least a portion of the hay handle assembly so that a user may use both hands to fill the hay net engaged with the hay handle assembly.

3. The method of claim 1 wherein the step of closing the hay handle assembly is followed by reversibly engaging a set of two components on the hay handle assembly with an engagement device to resist attempts by the animal to open the hay handle assembly and access forage through the open mouth of the hay net.

4. The method of claim 3 wherein the set of two components on the hay handle assembly are a first loop on a first handle piece and a second loop on a second handle piece so that engaging the first loop and the second loop through use of an engagement device precludes the first loop from moving from the second loop a distance sufficient to allow the animal to obtain forage from between the first handle piece and the second handle piece.

5. The method of claim 1 wherein:
   the set of at least one cord is a set of four cords; and
   the hay net is engaged to the hay handle assembly by the set of four cords, each cord of the set of four cords engaging a subset of loops of the at least a portion of the set of loops along the top perimeter of the hay net forming the open mouth.

6. The method of claim 1 wherein the step of positioning the hay handle assembly and hay net with inserted forage in proximity to the animal so that the animal may slowly obtain forage through the set of open gaps in the hay net but not obtain forage through the open mouth of the hay net includes
   engaging the hay handle assembly with a structure that holds the hay handle assembly and engaged hay net at a suitable height above a ground surface for the animal.

7. The method of claim 1 wherein the step of positioning the hay net engaged to the hay handle assembly with the quantity of forage in proximity to the animal so that the animal may slowly obtain forage through the set of open gaps in the hay net but not obtain forage through the open mouth of the hay net includes
   engaging a set of at least one mounting rope with the hay handle assembly and engaging the set of at least one mounting rope with one or more structures in order to hold the hay handle assembly and engaged hay net at a suitable height above a ground surface for the animal.

8. The method of claim 1 wherein the forage is hay.

9. The method of claim 1 wherein the animal to slowly obtain forage through the set of open gaps of the hay net is a horse.

* * * * *